United States Patent [19]
Yamamura et al.

[11] Patent Number: 5,346,942
[45] Date of Patent: Sep. 13, 1994

[54] MONOLITHIC REFRACTORIES

[75] Inventors: Takashi Yamamura, Okayama; Ryosuke Nakamura; Hiroshi Kiriyama, both of Bizen, all of Japan

[73] Assignee: Shinagawa Refractories Co., Ltd., Japan

[21] Appl. No.: 34,665

[22] Filed: Mar. 22, 1993

Related U.S. Application Data

[63] Continuation of Ser. No. 689,245, Jun. 11, 1991, abandoned.

[30] Foreign Application Priority Data

Oct. 11, 1989 [JP] Japan .................................. 1-262960
Mar. 19, 1990 [JP] Japan .................................. 2-66876

[51] Int. Cl.$^5$ .......................... C08K 5/09; C08K 5/01; C08L 61/00; B22C 1/22
[52] U.S. Cl. .................................. 524/322; 524/487; 524/489; 524/490; 524/594; 524/595; 523/143; 523/145; 523/146; 523/147
[58] Field of Search ................ 523/143, 145, 146, 147; 524/594, 595, 322, 489, 487, 490

[56] References Cited

U.S. PATENT DOCUMENTS

| | | | |
|---|---|---|---|
| 4,379,866 | 4/1983 | Henry et al. | 523/145 |
| 4,452,927 | 6/1984 | Matsushima et al. | 523/145 |
| 4,539,343 | 9/1985 | Nishimura | 523/146 |
| 4,879,319 | 11/1989 | Hughes | 523/141 |

FOREIGN PATENT DOCUMENTS

| | | |
|---|---|---|
| 0269788 | 6/1988 | European Pat. Off. . |
| 2815094 | 10/1978 | Fed. Rep. of Germany . |
| 56-045867 | 4/1981 | Japan . |
| 59-17072 | 4/1984 | Japan . |
| 60-137865 | 7/1985 | Japan . |
| 61-242962 | 10/1986 | Japan . |
| 62-28112 | 6/1987 | Japan . |
| 63-74973 | 4/1988 | Japan . |
| 63-156081 | 6/1988 | Japan . |
| 2196331 | 4/1988 | United Kingdom . |
| 2216117 | 10/1989 | United Kingdom . |

OTHER PUBLICATIONS

Patent Abstracts of Japan, vol. 4, No. 054 (C-008) Apr. 23, 1980; JPA-55025422 (Matsushita Elect. Works, Ltd.) Feb. 28, 1980; abstract.
Database WPIL, Week 8334, Derwent Publications Ltd, (AN83-744547) JPA-58120573 (Taiko Rozai) Jul. 18, 1983; abstract.

*Primary Examiner*—Paul R. Michl
*Assistant Examiner*—LaVonda R. DeWitt
*Attorney, Agent, or Firm*—Wenderoth, Lind & Ponack

[57] ABSTRACT

The present invention provides a monolithic refractory with self-flowability. A monolithic refractory of the first invention of the present invention contains refractory aggregates, liquid novolak type phenol resin and an organic separation preventative. A monolithic refractory of the second invention of the present invention contains refractory aggregates and a novolak type phenol resin solution with a number-average molecular weight of not more than 600. The first invention of the present invention gives good hot flowability and prevention of sedimentation of the aggregates to the monolithic refractory. The second invention gives good hot flowability, stabilization in adhesion and prevention of warpage of the hardened body obtained. With the present invention a monolithic refractory can be suitably selected and used according to its intended use and purpose.

4 Claims, 6 Drawing Sheets

O — FLOWABILITY UNDER HEAT

● — SEPARATED DEPTH

MONOLITHIC REFRACTORIES

This application is a continuation of now abandoned U.S. patent application Ser. No. 07/689,245, filed Jun. 11, 1991 now abandoned.

TECHNICAL FIELD

The present invention relates to a monolithic refractory having self-flowability used for repairing and filling in various high temperature furnaces.

BACKGROUND OF THE INVENTION

Hot repairing materials which are used to fill cavities or depressions caused by damage to lining refractories by utilizing flowability of the materials have been widely used, particularly for BOF (Basic Oxygen Furnace), electric furnaces, AOD furnaces, ladles, etc.

As such hot repairing materials are materials that are generally charged into a furnace at high temperatures and are able to fill cavities caused by damage because of the natural flow of the materials themselves to exhibit effects as repair materials, there are required to have good flowability and high adhesive strength with lining surfaces.

As such materials, it is general to have a type such as a plastic, massive, or solid state in which coal-tar pitch is added to a basic aggregate and heat-kneaded or sometimes creosote etc. are added to knead at normal temperature, or a powder state etc. in which powder or granular pitch is added to the aggregate. Coal-tar pitch has been widely used as a binder for a hot repairing material or a baking material, as it has properties wherein the residual carbon after heating is high, forming good carbon bonds and it has a relatively low price.

However, as the volatile gas of pitch contains harmful substances, strong fuming is generated during hot repairs to deteriorate the working environment.

Pitch looses volatile matter and carbonizes by decomposition and polymerization reactions at about 500° C. or more. However, as it is a mixture of organic matter of various components, the reaction proceeds in a complicated fashion. For this reason, it takes a long time for the pitch to carbonize at 500°–600° C. i.e. for the hot repair material or baking material to harden.

Various attempts have been proposed to improve the defects of hot repair material or baking material which use such coal-tar pitch type binders.

For instance, in Japanese Patent Publication No. 59-17072, a material is disclosed in which a novolak type resin is added to a basic aggregate and heat-kneaded to obtain a massive solid body. However, the material begins to set and carbonize on its surfaces before the inside of the massive body begins to melt and soften. Therefore, in many cases, it does not flow as a whole and even if it partially flows, it is difficult to obtain a satisfactory repair effect because warpage is great and adhesive properties are unstable on the periphery portions extended by flowing.

Also, in Japanese Patent Application Laid Open No. 61-242962, a repair material has been disclosed, in which granular type coal-tar pitch, granular or liquesfied low molecular weight thermoplastic resins and an organic solvent are added to basic aggregate and kneaded to obtain a block state material. However, this repair material requires mechanical pressure for adhesion and is poor in natural flowability, so it is difficult to fill in concave portions as a fluid.

Further, in Japanese Patent Publication No. 62-28112, formulations have been disclosed, in which phenol resin or melamine resin and powdery carbon are added to a thermoplastic material selected from a group comprising aromatic petroleum resins, petroleum pitch and heavy oil instead of coal-tar. However, it is not sufficient for the repair of converter charging side walls etc. which requires abrasion resistant properties, as the petroleum thermoplastic material has poor strength after carbonization and hardening.

In Japanese Patent Application Laid Open No. 63-74973, a repair material has been disclosed in which paraffin is added to a material comprising a basic refractory aggregate, a bituminous material such as coal-tar etc. and a thermosetting resin such asphenol resins etc. and which is then kneaded to form it into small lumps. It has advantages in that the use of paraffin allows low temperature kneading and fuming during kneading is prevented. However, it has defects in that surface hardening of the lumps is fast when they are thrown into a high temperature furnace and it is difficult for each of the lumps to unit with each other through melt-softening.

Also, in Japanese Patent Application Laid Open No. 63-156081 a material in which refractory materials and powdery resin are kneaded with polyhydric alcohol has been disclosed. However, it does not flow at all and has scarcely any adhesive strength, particularly when a thermosetting type resin was used as the powdery resin.

In this way, since coal-tar pitch, takes a long time to harden and remains in a softened for quite sometime after heating, it shows some flowability, but it causes the generation of harmful substances and repairs require long hours. On the other hand, in the case of a resin type bonding agent, hardening begins on the surface of the agent before softening of the inside of the hot repair materials or baking materials by heating begins. For these reasons, it can not flow as a whole and it has problems in adhering to lining surfaces and tends to be difficult to form into monolithic bodies.

The present invention has been invented to solve the problems described above. The object of the present invention is to provide a monolithic refractory having excellent flowability under heat, that controls warpage phenomena which readily generates on the periphery of a lined body, and high adhesion by using a phenol resin as a bonding agent capable of forming good carbon bonds.

DISCLOSURE OF THE INVENTION

Accordingly, the present invention relates to a monolithic refractory having self-flowability characterized in that the flow value is in the range of 125–180 mm by adding and mixing an organic separation preventative having a melting point or a softening point not less than 50° C. to a formulation comprising 80–90 wt.% refractory aggregate and 10–20 wt.% liquid novolak type phenol resin (hereinafter, this invention being referred to as the first invention).

Further, the present invention relates to a monolithic refractory having self-flowability at room temperature characterized in that the flow value is in the range of 125–180 mm by mixing refractory aggregates with a phenol resin solution made from dissolving a novolak type phenol resin having a number-average molecular weight of not more than 600 to an organic solvent in which the phenol resin content is in the range of 3.5–10 wt.% (hereinafter, this invention is referred to as the second invention).

Hereinafter, the first invention of the present invention will be described in detail.

The monolithic refractory of the first invention of the present invention is not a conventional plastic, solid or powdery state material but is a slurry state material having self flowability and not a material which softens and flows not just from furnace heat but also flows at normal temperatures. Accordingly, when the material is charged into a furnace, it shows good flowability, filling cavities due to damage of the refractory lining walls inside the furnace, forming dense and unified refractory layers together with strong carbon bond, and making effective repair possible..

As a bonding agent for monolithic refractories used for a monolithic refractory of the first invention of the present invention, a known liquid novolak type resin is used. Novolak type phenol resins are originally solid at normal temperatures and there are resins which are either powdery or granular form. However, a liquid novolak type resin containing various organic solvents is used in the present invention for giving self-flowability at normal temperatures.

As for novolak type phenol resins to be a base for the liquid novolak type phenol resin, there are resins having various molecular weights according to their degree of polymerization. Although molecular weight is not particularly limited, resins having higher molecular weights have higher viscosity when they are liquified by adding an organic solvent and as far as imparting self-flowability at normal temperatures is concerned, there are tendencies to increase the mixing amount of liquid resin, which cannot be said to be economic. Also, there are tendencies for higher molecular weight resins to proceed faster in polymerization when exposed to high temperatures, to set faster and to lower the flowability under heat, and are therefore not preferable.

If only the flowability is to be imparted, this is readily obtained by increasing the mixing amounts of liquid novolak type phenol resins to refractory aggregates. However, the refractory aggregates may precipitate and segregate during storage or by vibration during transportation by trucks etc, making practical use difficult.

In a monolithic refractory of the first invention of the present invention, the most important point resides in reconciling good flowability and preventing precipitation and segregation of aggregates. It is a matter of course that the quality characteristics of hardened bodies lined during heat, namely, filling density, strength etc. should be satisfied.

Liquid novolak type phenol resins consist of a resinous portion and an organic solvent, and there are various articles on the market which have different viscosities in a liquid state due to said proportion or type of solvent, etc. For imparting flowability to a refractory, smaller amounts thereof are possible by using a liquid novolak type phenol resin with low viscosity, while rather increased mixing amounts are necessary when a liquid novolak type phenol resin with high viscosity is used. Therefore, it is effective to use a small amount of resins with low viscosity so far as economic efficiency is concerned.

As for the viscosity value of the liquid novolak type phenol resin, this changes according to temperature even if the same resin is used. The viscosity value is high at low temperatures and lowers at high temperatures. This is a big enough change to influence the self-flowability of the formulations by changes is atmospheric temperature. In the case of low viscosity resin, if resins with approximately not more than 10 poise are used, changes in flowability over time during storage after mixing the formulations are large and therefore, is not preferable. Although the reasons have not been clarified, it is felt that liquid permeation into aggregate may influence flowability during storage.

On the other hand, even if viscosity is as high as to exceed 400 poise, this is not an obstacle in practical use, but the amount of liquid resin necessary for giving self-flowability will be increased which is not economical. Accordingly, it is preferable to control viscosity of the liquid novolak type phenol resin to approximately the range of 10 to 400 poise for temperature changes in the period from production of the formulations to final use. Further, the same effect can be obtained when liquid resin with high viscosity is used and the viscosity of the liquid phase is controlled to be in the range described above by adding an organic solvent separately.

As for the ratio of the resin content in the liquid novolak type phenol resin to an organic solvent, there are many resins which have about 50% resin content in normal liquid novolak type phenol resins. However, from the view point of strength due to formation of carbon bonds in a hardened body, it is usable if liquid novolak type phenol resins have not less than approximately 15% resin content.

The organic solvent contained in the liquid novolak type phenol resin is not specifically limited, a liquid which dissolves phenol resin is available and in general alcohols such as ethanol, Cellosolve, ethylene glycol, triethylene glycol, propylene glycol etc., ketones such as acetone, methyl ethyl ketone etc. or furfural etc. may be used alone or mixed thereof. However, they must be selected with due regard to viscosity and safety such as the flash point thereof.

Figure 1:
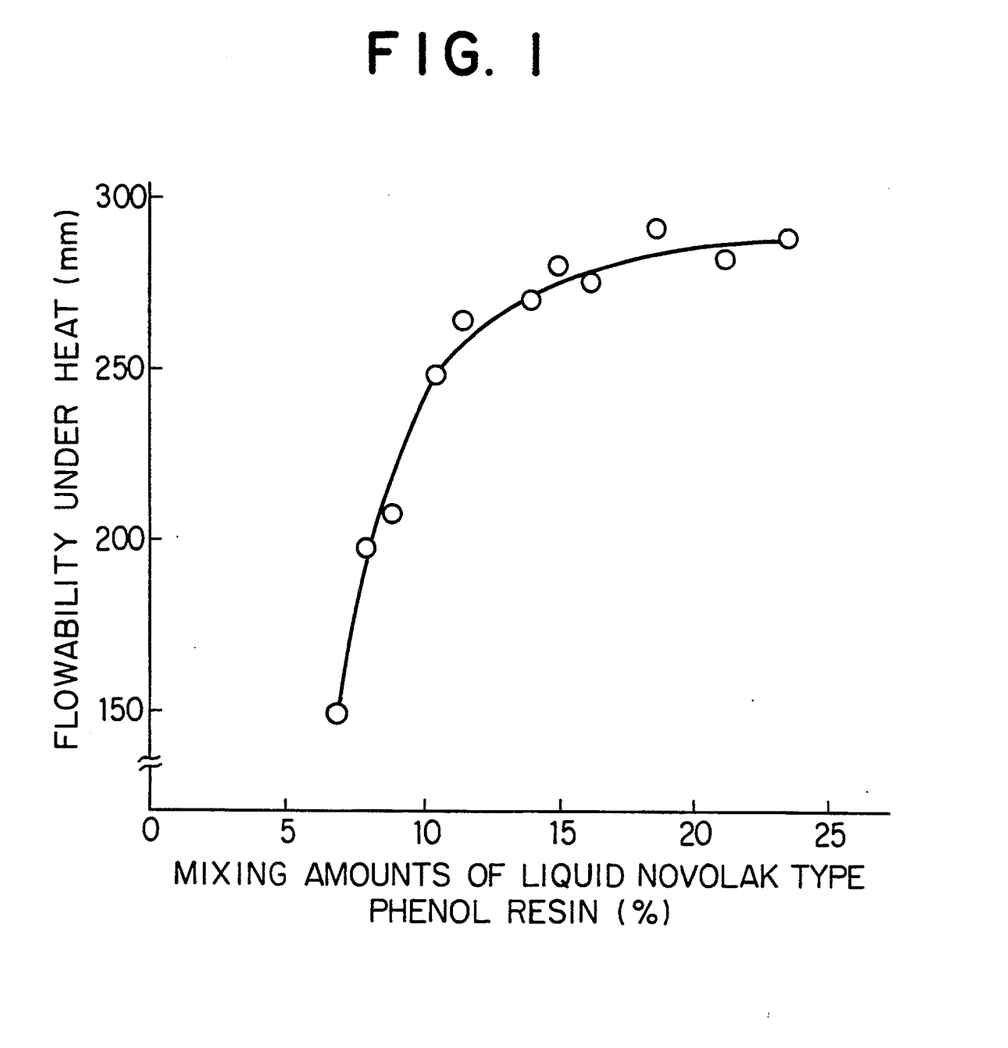
FIG. 1 shows a relationship between mixing amounts of a liquid novolak type phenol resin and flowability under heat.

Next, an experiment to determine the minimum necessary amounts of liquid novolak type phenol resin was carried out. FIG. 1 shows a relationship between added amounts of liquid novolak type phenol resin and flowability under heat. As for refractory materials, regulated grain sized magnesia clinker was used to which a liquid novolak type phenol resin with various viscosities was added. In this way a sample was made in which the amount of liquid novolak type phenol resin was controlled to give self-flowability to a slurry material after kneading at normal temperatures, of 140–145 mm as a flow value. 1 kg of this sample was dropped onto a flat plate made of a castable refractory in a testing furnace heated to 1000° C., after letting the sample stand, the diameter of the sample which was expanding by flowing was measured and the value was plotted. As apparent from this figure, when the amount of liquid novolak type phenol resin is not more than 10%, flowability of the sample drastically decreases though flowability at normal temperatures was about the same. On the other hand, when a considerable amount of liquid novolak type phenol resins was used, there were no problems. However, if the mixture exceeded 20%, the improvement of flowability under heat was not large, and therefore not economical. Accordingly, it is preferable to mix liquid novolak type phenol resins in amounts of 10–20 parts by weight.

In this way, a kneaded mix which forms satisfactory carbon bonds after heating and having self-flowability at normal temperatures was obtained. However, another important problem is that refractory aggregates sediment and separate during storage and especially from vibration during transport, as refractory aggregates generally have an unwettable property with liquid novolak type phenol resins. If refractory aggregates sediment and separate, the lower sedimented refractory aggregate forms a caking layer, exhibiting no flowability at all and takes on a state where only the upper liquid resin layer containing fine powder flows. In this way, as the sedimented layer of the separated material cannot be deformed, it is in a lump form when it is charged into a high temperature furnace and as only the upper liquid resin layer flows, a satisfactory hardened body structure sometimes can not be obtained.

As a result of studies to resolve these problems, an organic separation preventative having a melting or softening point of not less than 50° C. was obtained.

As such an organic separation preventative having a melting or softening point of not less than 50° C., there are polyolefins such as polyethylene, polypropylene etc., methane series hydrocarbons such as paraffins etc., aliphatic acids such as stearic acid and their salts or esters, oils and fats and their esters, various synthetic high molecular compounds etc., the compositions thereof being not particularly limited.

Organic separation preventatives are solids at normal temperatures similar to refractory aggregates, and by adding small amounts, a mix takes on a state in which liquid resin amounts look insufficient, and sedimentation separation of the refractory aggregates can be controlled to a degree that is practically negligible. Therefore an organic separation preventative used in the present invention should stay in solid form at temperatures at least from production of the mix until use, and considering temperature rises during transportation, it should have a melting or softening point of not less than 50° C. As for the form of an organic separation preventative, a processed form with a big surface area such as in powder, flake, fibrous or ribbon like state is preferable. Further, it is preferable that the organic separation preventive agent be insoluble or sparingly soluble to an organic solvent contained in liquid novolak type phenol resins used in the first invention of the present invention and it is also preferable that the agent liquefies with low viscosity at relatively low temperatures, for instance, at 200° C. and preferably at not more than 150° C. Since a solid at normal temperatures prevents sedimentation of refractory aggregates, liquefying at relatively low temperatures by heating promotes flowability during heat.

Further, it is preferable that the specific gravity of an organic separation preventative be the same or smaller than that of the liquid novolak type phenol resin. If the specific gravity is smaller than the liquid resin, a buoyant force acts on the organic separation preventative, and the effect of preventing deposition of refractory aggregates having greater specific gravity is large.

A small adding amount of an organic separation preventative may be used. Normally, 0.1-5 wt% is used for a mixture of refractory aggregates and a liquid novolak type phenol resin. If the adding amount is not more than 0.1 wt%, there is little and when compounding amounts of the liquid resin are large, enough effects are observed by adding not more than 5 wt%, so adding greater amounts is not necessary. When excessive amounts are added, sometimes self-flowability or flowability under heat of the whole mixture may lower. Optimum adding amounts of an organic separation preventative is determined by grain size distribution of the refractory aggregates, viscosity or mixing amounts of the liquid novolak type phenol resin or the form of the organic separation preventative itself, etc.

In order to see if the range of flowability under heat and self-flowability which shows the prevention the ability of the refractory aggregates of the monolithic refractory sedimentation separation of the first invention of the present invention obtained in a manner described above, by mixing refractory aggregates, liquid novolak type phenol resin and an organic separation preventive agent were proper or not was stipulated as the flow value by a flow testing method of JIS R-2521. The flow testing method is originally a method which evaluates flowability of alumina cement. However, it is also used for evaluating the flowability of castable refractories. Accordingly, it can also be used as it is for the adjustment of self-flowability in the monolithic refractory of the first invention of the present invention.

Figure 2:
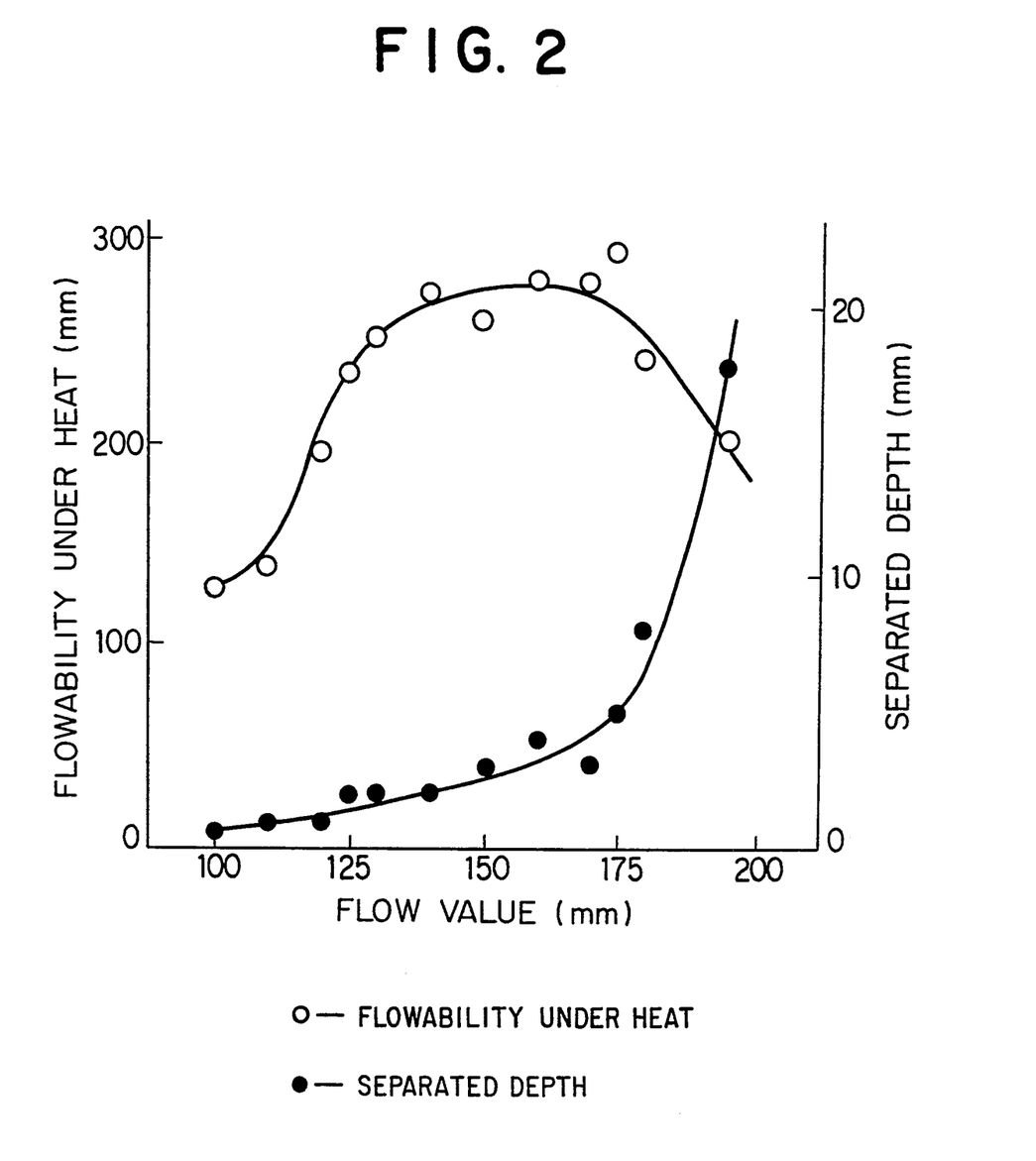
FIG. 2 is a graph showing a relationship between flow value and flowability under heat.

Further, as sedimentation of the refractory aggregates was sometimes observed when the flow value was large, it is necessary to stipulate certain ranges of flow value. As shown in FIG. 2, a relationship between the flow value and flowability under heat and separation of refractory aggregates on samples in which an organic separation preventative was added and mixed with formulations comprising magnesia clinker and liquid novolak type phenol resin was measured. A sample was made by suitably changing the mixing amount of liquid novolak type phenol resin with various viscosities and suitably adding and mixing an appropriate amount of various organic separation preventatives, just after which the flow value was measured. On the other hand, after letting the samples stand at normal temperatures for 3 days from the date of their production a test to determine flowability under heat was carried out at 1000° C. in the same manner as indicated by the results shown in FIG. 1. Separated depth of refractory aggregates was measured by inserting a sample in a cylindrical vessel to a height of 100 mm, vibrating this for 30 min., and then measuring the depth of an upper layer comprising fine powder and fluid which does not contain refractory aggregates.

If the flow value is less than 125 mm, the drop of flowability under heat is large and if it exceeds 180 mm, liquid resins preferentially flow by the influence of separation of refractory aggregates as well, so this has a tendency to lower the flowability and expansion as a whole. If the flow value exceeds 180 mm, the separated depth increases, as sedimentation of refractory aggregates after vibration rapidly increases.

In this way, if the flow value is not more than 125 mm, the flowability under heat is not sufficient, as the self-flowability is too small. On the other hand, if the flow value exceeds 180 mm, settling of refractory aggregate is sometimes observed when vibration is added even if an organic separation preventative is added. Therefore, to exhibit the properties of a monolithic refractory with self-flowability of the first invention of the present invention, the flow value should be in the range of 125-180 mm.

As the viscosity of a liquid novolak type phenol resin changes according to temperature, the flow value differs with an atmospheric temperature even if a mixture has the same mixing ratio. Therefore, it is difficult to stipulate a monolithic refractory with the self-flowability of the first invention of the present invention only by the formulation ratio. However, at least in a composition in which an organic separation preventative is added and mixed with the formulations comprising 80–90 wt% refractory aggregates and 10–20 wt% liquid novolak type phenol resin, if the flow value is stipulated, the flowability under heat and the sedimentation and separation preventability of refractory aggregates which achieve an object of the first invention of the present invention are obtained.

Refractory aggregates which may be used for the monolithic refractory with self-flowability of the first invention of the present invention are preferably basic refractory materials such as magnesia clinker or dolomite clinker, etc. when used for instance in refining furnaces, etc. acid or neutral refractory materials such as silica, zircon or alumina, etc. as well as non-oxide refractories such as silicon-carbide, etc. for molten pig iron vessels, etc. and are not specifically limited. Refractory aggregate grain sizes are preferably used for normal monolithic refractories, for instance, adjusted to a grade in which fine powder of under 0.3 mm is in the range of 20–60%.

For improving the composition after setting etc., it is possible to add a small amount of super fine powder such as silica, alumina, zircon etc. Further, for reinforcing carbon-bonds, a carbonaceous material such as graphite, carbon-black, solid pitch, meso-phase carbon etc. may be added and for improving flowability, it is possible to add a small amount of a surfactant.

Next, the second invention of the present invention will be illustrated. As described above, a monolithic refractory with self-flowability of the first invention of the present invention has objects of possessing good flowability and preventing sedimentation and separation of aggregates. However, in some applications, adhesive strength was insufficient and warpage of the obtained hardened body was sometimes a problem. The monolithic refractory of the second invention of the present invention was developed to give high adhesive strength and to prevent warpage of the hardened body obtained as an object, in which a specific novolak type phenol resin is used in a specific resin concentration range as a binder.

The monolithic refractory of the second invention of the present invention is not a conventional material in a state such as plastic, solid or powder but a slurry material with self-flowability as well as a monolithic refractory of the first invention and not a material which softens and flows by furnace heat but a material having flowability even at normal temperatures. Therefore, when the materials are dropped into a furnace under heat, an effective repairing is possible, as the materials show good flowability even under high temperatures, forming a dense unified refractory layer and adhering tightly to lining surfaces inside the furnace.

As for the binder used for the monolithic refractory of the second invention of the present invention this may be a specified binder among the known novolak type phenol resins and which is formulated to have a specified resin concentration.

The flowability of a monolithic refractory in a high temperature furnace is substantially the same as its behavior under normal temperatures. In a conventional pitch type material, the pitch softens to a flowable state by being exposed to high temperatures even if it is solid, plastic or powder at normal temperatures. As pitch requires long hours to be hardened through complicated reactions, flow of the whole material is possible. However, materials in which various resins are used, are easy to harden compared with pitch. For this reason, a resin softened by heat subsequently begins hardening. In a solid, plastic or powdery material, if the material surfaces begin to soften, the inside remains in its original condition and does not flow and the surface hardening begins before the inside flow begins so that it cannot flow as a whole material.

The monolithic refractory of the second invention of the present invention is not a refractory which softens and flows after receiving heat from a high temperature furnace but flows even at normal temperatures and begins to flow as soon as the refractory is dropped into the furnace. To give flowability at normal temperatures, a refractory material is produced by kneading with a phenol resin solution in which a binder novolak type phenol resin is dissolved in an organic solvent.

Having self-flowability at normal temperatures means that a material flows and deforms from its own weight, for instance a material with self-flowability is a material which has a flow value of not less than 125 mm according to JIS R-2521 flow testing method. As significant improvements in flowability under heat are not observed even when flow value exceeds 180 mm, it is preferable to have the flow value of the monolithic refractory of the second invention of the present invention in the range of 125–180 mm.

Another object of the monolithic refractory of the second invention of the present invention is to have high adhesive strength and maintain the strength for a long time after the refractory is lined on a damaged portion inside a furnace.

A monolithic refractory is useless for repairing a furnace under heat unless it has high adhesive strength to wall surfaces of a high temperature furnace as it easily peels off from repaired surfaces as a result of mechanical or thermal shock, etc. Therefore, high adhesive strength and stability thereof are required for a monolithic refractory for repairing.

To complete the second invention of the present invention, various studies were carried out concerning the relationship between a novolak type phenol resin and adhesive strength.

Novolak type phenol resins with various molecular weights according to polymerization degree thereof have been sold on the market mainly in pellet or powder state, generally they have a number-average molecular weight of about 400–1000. Solid or powder resins with a low molecular weight of under 400, for instance a resin in which unreacted free phenol remains, have low softening point and are not sold on the market because they sometimes solidify during storage at normal temperatures. However, in cases where a resin is dissolved in an organic solvent and used in a liquid state such as in the present invention, phenol resins used as a base need not be in solid or powder form and there are no problems for use if the resins were viscous at normal temperatures due to low molecular weight.

The inventors of the present invention investigated the influences of various molecular weights novolak type phenol resins on adhesive strength. Novolak type phenol resins of various molecular weights were dissolved in ethylene glycol and/or propylene glycol to make a novolak type phenol resin solution with viscosity suitable to give self-flowability. On the other hand, magnesia clinkers were used as refractory aggregates and their grain sizes were controlled to have a grain size constitution suitable for a monolithic refractory. 83 parts magnesia clinker and 17 parts novolak type phenol resins were mixed and kneaded to make monolithic refractory samples.

Figure 3:
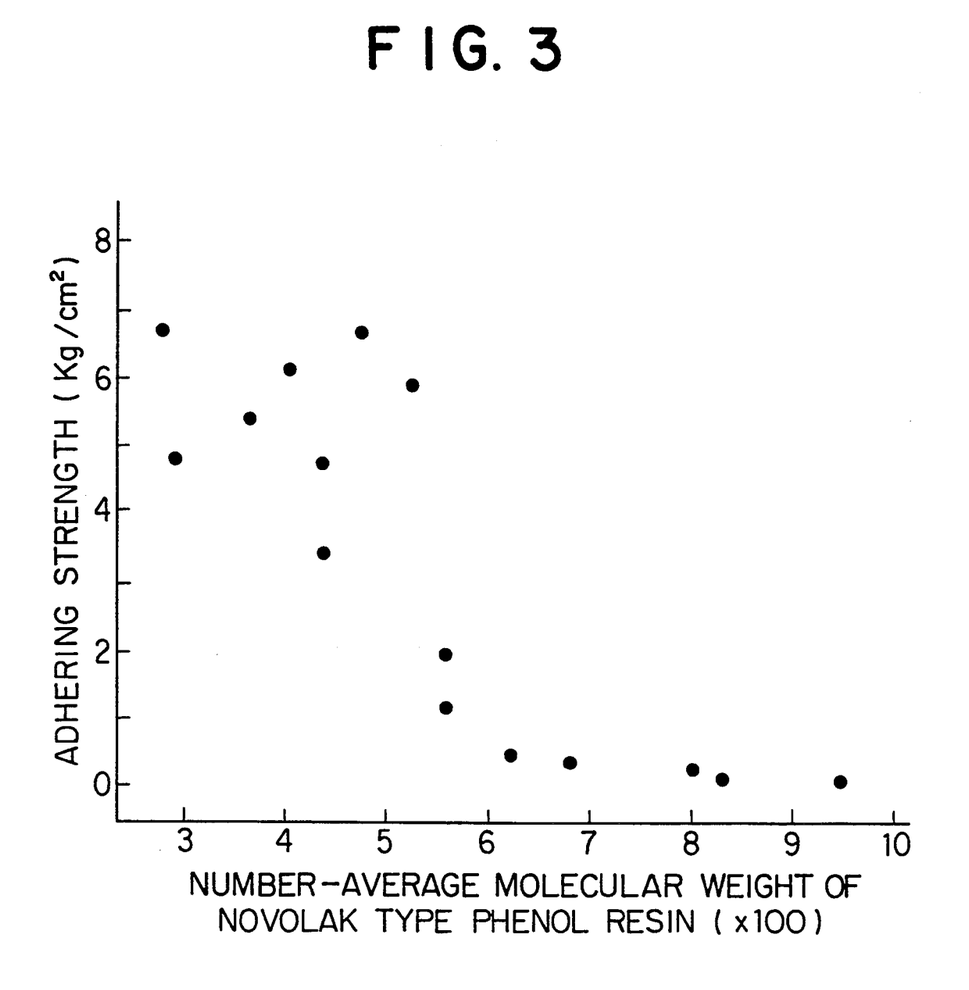
FIG. 3 is a graph showing a relationship between the number-average molecular weight of a novolak type phenol resin and adhesive strength.

Metal cylinders with a 22 mm inner diameter were laid on a brick surface which was heated to 1000° C., each sample was laid in a cylinder, and after the sample adhered to the brick surface, the shearing strength needed peel the adhered sample was measured to make comparisons of the adhesive strength. The results are shown in FIG. 3. As is apparent from this figure, if the molecular weight of a novolak type phenol resin exceeds 600, the adhesive strength lowers somewhat below 1 kg/cm$^2$. On the other hand, if the molecular weight is not more than 600, good adhesive strength is shown with little change. Particularly, a resin with a molecular weight of not more than 550 is excellent as it has an adhesive strength of not less than 3 kg/cm$^2$.

In this way, although it is not clear that differences in adhesive strength arises from differences in the molecular weight of the novolak type phenol resin, it may be assumed that differences in wettability of the resin solution to high temperature brick surfaces has a big influence.

Figure 4A:
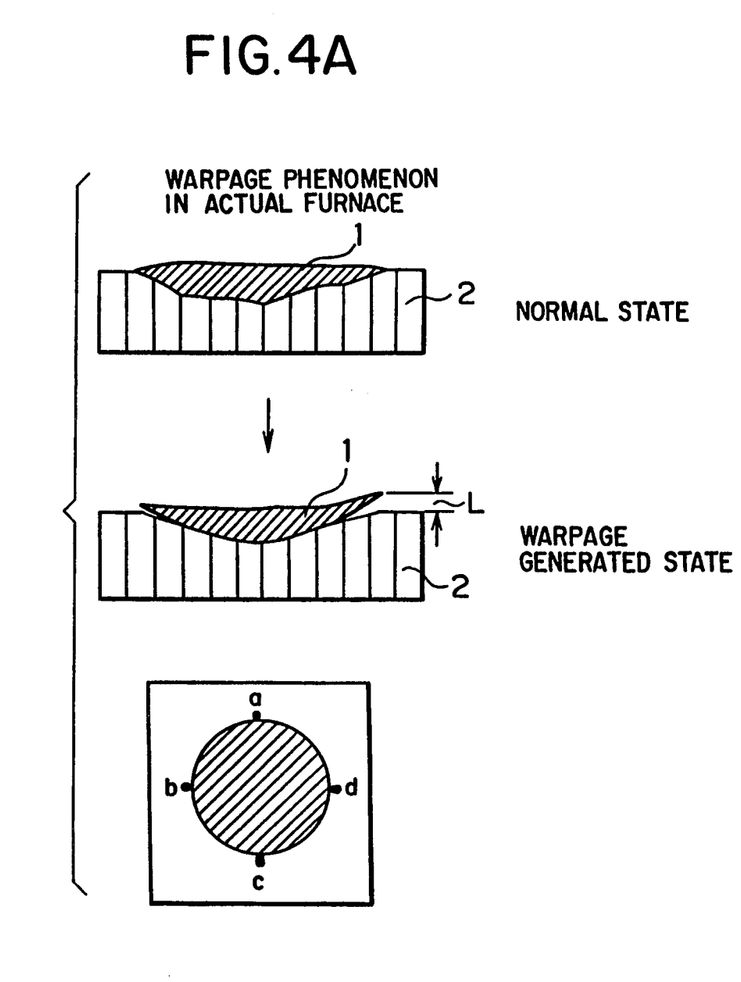
FIG. 4 is a sectional view of warpage phenomenon as observed in a real furnace (A) and in a laboratory furnace (B).

On the other hand, in a real furnace, the inventors found that even a monolithic refractory in which a novolak type phenol resin with a number-average molecular weight of not more than 600 was used peeled off after 1 or 2 operations. After investigating the cause of this peeling, it was found that not only the adhesive strength but also the so called warpage the phenomenon of the lined body itself on the periphery of the lined body greatly affects adhesive stability. Damaged portions inside a furnace were filled and repaired using the flowability of the monolithic refractory itself. However, on the periphery of the lined body, the thickness of the repairing material becomes thin. The warpage phenomenon was sometimes observed in this portion as shown in FIG. 4(A). If the warpage phenomenon appears on the periphery of the lined body, for instance, a molten metal with greater specific gravity enters into any gaps formed by the warpage on the periphery and works like a wedge to peel off the whole lined body, even if the center portion of the lined body had sufficient adhesive strength. Accordingly, it is very important to restrict this warpage phenomenon as much as possible to stabilize adhesion.

Figure 4B:
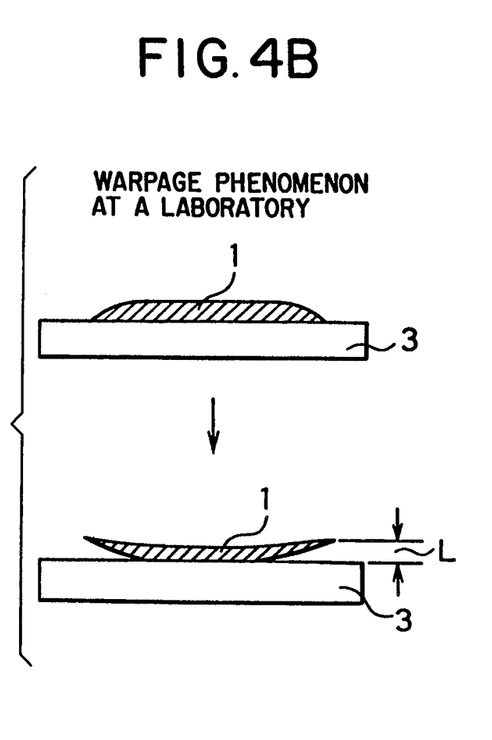
Figure 5:
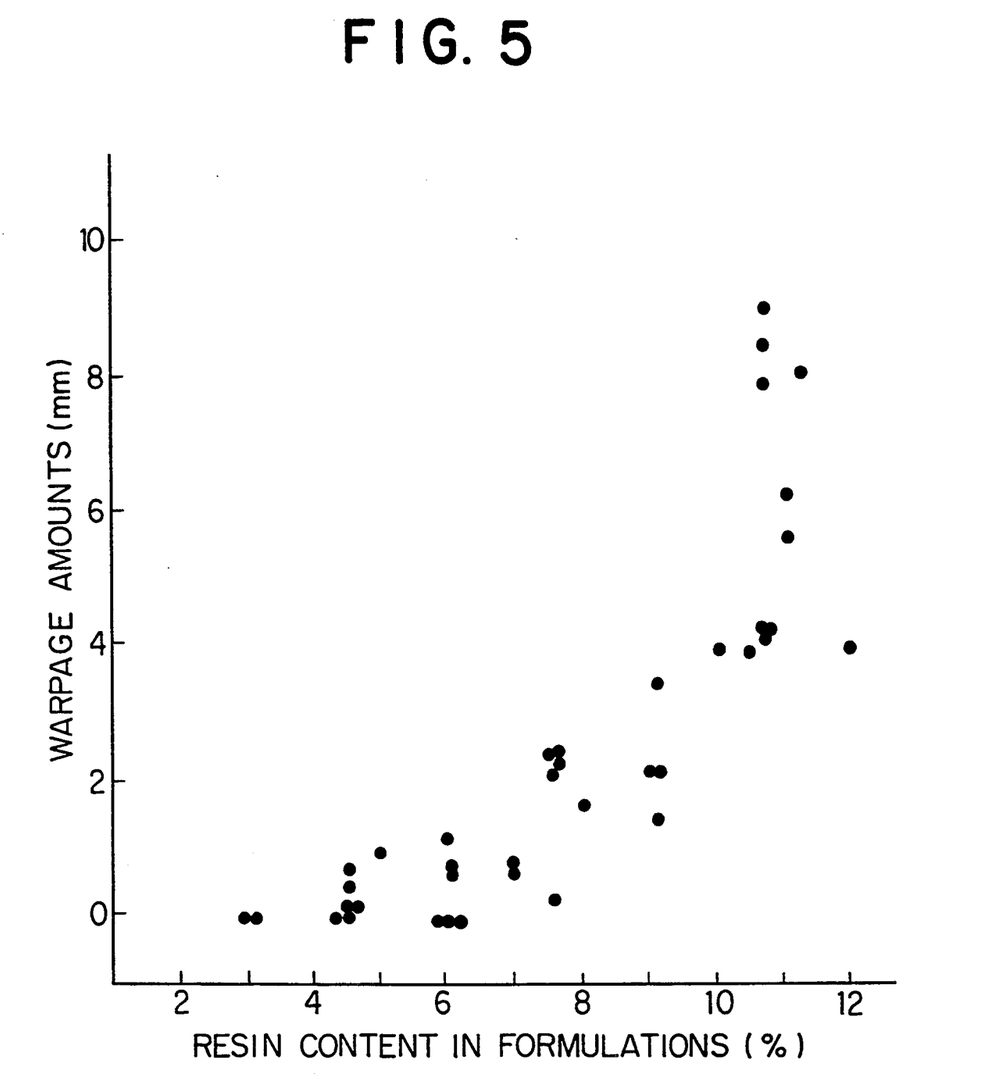
FIG. 5 is a graph showing a relationship between resin amount in the formulations and amount of warpage.

1 g samples were laid on a castable plate which was heated to 1000° C. at a laboratory and the state after the samples flowed and expanded was observed as shown in FIG. 4(B). Novolak type phenol resin solutions are prepared by dissolving a novolak type phenol resin having a number-average molecular weight of not more than 600 with various organic solvents in various mixing rates. Monolithic refractory samples having self-flowability were prepared by mixing and kneading these solutions and grain size controlled magnesia refractory materials in ratios of solution to refractory material of 10:90-20:80. Warpage amounts on the periphery of the flowed and expanded 1 kg samples at 1000° C. were measured at 4 points as shown in FIG. 4(B) and the average value was regarded as the warpage amount. Correlation was studied from many angles between the warpage amount and kinds of organic solvent, mixing ratio between the organic solvent and resin portion, and viscosity of the solution etc. on these results and it was found that there is a correlation between content of novolak type phenol resin in the formulations and the warpage amount as shown in FIG. 5. From FIG. 5 it can be seen that the warpage amount is smaller when smaller amounts of a novolak type phenol resin are contained in the formulations and when resin amounts are increased, the warpage amounts increase, particularly when the resin amounts exceed 10% where substantial warpage sometimes occurs suddenly.

Although the mechanism behind such warpage phenomena is not necessarily clear, it is assumed that the occurrence of volume shrinkage during processes such as softening by heat, transferring from a liquid state to a solid state and carbonizing thereafter of the novolak type phenol resin, is the largest factor. Accordingly, it is considered that the warpage amounts can be reduced by appropriately restricting the amount of novolak type phenol resin in the formulations. Although no occurrence of warpage is most preferable, considering the state of real furnaces, according to the results of this experiment it is preferable to have warpage amounts not greater than 4 mm, and if possible not more than 3.5 mm. On the other hand, if the content of a novolak type phenol resin in the formulation is as low as 3%, there is little or no occurrence of warpage. However, bonding by carbonization of the phenol resin is rather insufficient and a drop in strength was observed. Therefore, the preferable amount of novolak type phenol resin in the formulations in the second invention of the present invention is in the range of 3.5-10 wt%.

As for the novolak type phenol resin solution of the second invention of the present invention, although mixed solutions of a novolak type phenol resin and various solvents were used for various experiments, practically, these so called liquid novolak type phenol resins are generally sold on the market. Among there, resins having a number-average molecular weight of not more than 600 having a partially free phenol content, a suitable viscosity of for instance, about 10-400 poise in which the monolithic refractory has self-flowability, can be used as described above. It is matter of course that the viscosity can be controlled by adding an organic solvent separately. It is necessary to control the resin content in the monolithic refractory to be in the range of 3.5-10 wt%.

To satisfy self-flowability and resin content, the mixing ratio between a refractory material and the novolak type phenol resin solution should be determined by totally considering the resin contents in a novolak type phenol resin solution and differences in viscosities of a solution which are related to the kind of organic solvent.

Organic solvents which dissolve the novolak type phenol resins used for the monolithic refractory of the second invention of the present invention are not specifically limited, and solvents which dissolve phenol resin are permissible, with solvents used for the first invention described above also being usable.

Refractory aggregates used for the second invention of the present invention are also not specifically limited, with the same type refractory aggregate as used in the first invention being acceptable along with the same grain sizes of refractory aggregates as in the first invention.

Further, for restricting sedimentation of refractory aggregates, adding small amounts of an organic separation preventative used in the first invention described above such as polyolefins such as polypropylene etc., methane type hydrocarbons such as paraffin etc., aliphatic acids such as stearic acid etc. and the salts or esters thereof are available.

For improving a matrix after hardening etc. adding small amounts of super fine powders such as silica, alumina, zircon etc. is also possible. Further, for reinforcing carbon bonding, adding small amounts of, for instance, graphite, carbon black, solid pitch, mesophase carbon etc., for preventing oxidation of carbon bonds or to improve strength under heat, adding small amounts of metal powder of Al, Si, Mg or alloys thereof is allowable. Also, it is possible to add small amounts of a surfactant to improve flowability.

BRIEF DESCRIPTION OF THE DRAWINGS

In the Figures, 1 denotes a monolithic refractory, 2 denotes lined bricks, 3 denotes a castable refractory plate and L denotes amount of warpage.

EXAMPLE 1

Monolithic refractories of the first invention of the present invention and a monolithic refractory of a Comparative Example and Conventional Examples with formulations described in Table 1 were prepared, and flowability under heat, sedimentation of refractory aggregate and the properties of cast materials under heat of each of the monolithic refractories were measured. The results are shown in Table 1.

Each of the properties etc. were measured according to the following testing methods.

(a) Flow values were measured according to JIS R-2521.
(b) Separated depths were measured by the method illustrated in FIG. 2.
(c) Flowability under heat was measured after letting each of the samples stand for 7 days after preparation as illustrated by the results in FIG. 1.
(d) Flowability termination time was measured by dropping a sample and observing the time it took for circular expansion flow to stop. Fuming conditions were measured visually.
(e) Properties of cast products under heat:

A refractory sagger with inner dimensions of 200×125×90 mm was set in a small furnace, heated to 1200° C., burning stopped and when the temperature of the inner surfaces of the sagger cooled to 1000° C., a 6 kg sample was charged into the sagger, let stand and after it was cooled to normal temperatures samples were prepared by cutting. Porosity and bending strength were measured on these samples by normal methods.

TABLE 1

|  | Example | | | | Comp. Example | Conventional Example | | | |
| --- | --- | --- | --- | --- | --- | --- | --- | --- | --- |
|  | 1 | 2 | 3 | 4 | 1 | 1 | 2 | 3 | 4 |
| MgO clinker (%) | 88 | 85 | 83 | 80 | 83 | 80 | 85 | 80 | 80 |
| Binder (Kinds) | Novo. Ph. Resin | " | " | " | " | " | " | Petro. Resin | Pitch Creosote |
| Binder (Form) | Liquid | " | " | " | " | Powder | Solid | Viscous | " |
| Binder (Resin %) | 28 | 50 | 42 | 60 | 42 | >95 | >95 | — | — |
| Binder (Mix %) | 12 | 15 | 17 | 20 | 17 | 20 | 15 | 20 | 20 |
| Sep. Preventative (Kinds) | Polyethylene | Paraffin | " | Polystyrene | — | — | — | — | — |
| Sep. Preventative (Form) | Powder | Flake | Ribbon | Fiber | — | — | — | — | — |
| Sep. Preventative (Soft. Point °C.) | 107 | 62 | 54 | 99 | — | — | — | — | — |
| Sep. Preventative (Add. %) | 3.5 | 1.5 | 1.5 | 0.2 | — | — | — | — | — |
| Monolithic Refractory |  |  |  |  |  |  |  |  |  |
| Monolithic (Form) | Slurry | " | " | " | " | Powder | Solid | Plastic | " |
| Monolithic (Flow Value mm) | 128 | 162 | 175 | 141 | 188 | — | — | No Flow | " |
| Monolithic (Sep. Depth mm) | <1 | 3 | 5 | 2 | 18 | — | — | — | — |
| Test under 1000° C. |  |  |  |  |  |  |  |  |  |
| Test (Flowability mm) | 260 | 281 | 295 | 277 | 192 | 148 | 135 | 233 | 264 |
| Test (Flow.Term.Time. sec) | 32 | 28 | 26 | 30 | 44 | 84 | 115 | 52 | 128 |
| Test (Fume) | Little | " | " | " | " | L~M | " | Middle | Big |
| Cast. Product under heat Porosity (%) | 22.3 | 19.2 | 20.4 | 19.8 | 30.5 | 32.2 | 29.7 | 31.0 | 28.6 |
| Bend. Strength (Kg/cm²) | 43 | 59 | 48 | 92 | 21 | 20 | 21 | 4 | 25 |

Note:
L denotes little,
M denotes middle

EXAMPLES

The first and second inventions of the present invention will be further illustrated by the following Examples.

From the results, each of the Examples had little separation and showed excellent flowability in a short time. The porosity of the cast product was low, strength high and a lined body under heat with good filling ability through excellent flowability could be obtained.

On the other hand, the Comparative Example having the same composition as Example 3 except that a separation preventative was not added, and with a flow value of not less than 180 mm, had large separation and the flowability under heat after 7 days was also lowered sharply.

Conventional Example 1 was a powdery state monolithic refractory. It had a poor flowability and less filling ability under heat. Conventional Example 2 was a lump material with a size of about 30–50 mm which was prepared by heating and kneading the material at 80° C. and then cooling and solidifying it. It took a long time when the resin was liquefied to be flowable from a solids under heat. For this reason, hardening began at the surfaces so that the material had low flowability. Conventional Example 3 was a plastic body using a petroleum resin, the strength of cast products under heat with this material was very low and the porosity high. Conventional Example 4 was a material using a pitch type binder. Although it took a long time to flow, final flowability was rather good. However, the amount of fuming was very large and the porosity of cast products under heat was also high. Particularly, the difference in porosity between the upper and lower portions of the cast samples under heat was large, the upper portion showing a foaming state and porosity reached 48%.

Figure 6:
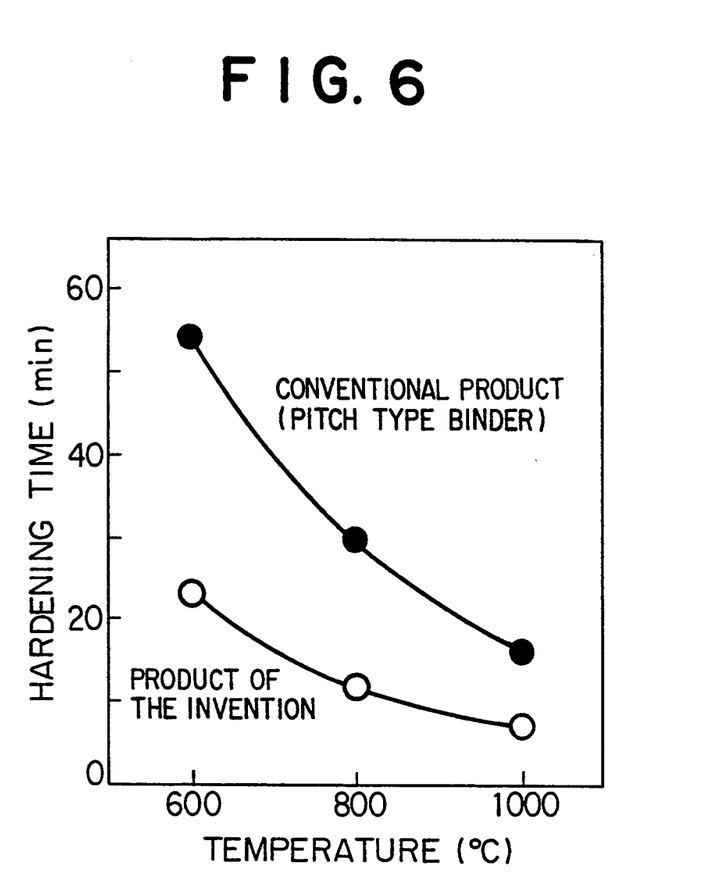
FIG. 6 is a graph showing hardening time at each of the temperatures in Example 2 and Conventional Example 4.

FIG. 6 is a drawing comparing hardening time at each of the temperatures between Example 2 of the present invention and the pitch type material of Conventional Example 4 in which 500 g samples were inserted into steel-cans which were then inserted from an upper portion of a furnace heated to a fixed temperature and the time until the surfaces of the samples in the cans became hard was measured. From the results, it is understood that Example 2 of the present invention hardens in a short time of about ½–⅓ compared with Conventional Example 4 of the pitch type at every temperature.

EXAMPLE 2

Monolithic refractories of the second invention of the present invention and monolithic refractories of the Comparative Examples and Conventional Examples with formulations described in Table 2 were prepared, and the properties of each of the monolithic refractories were measured. The results are shown in Table 2.

(a) Flow values were measured according to the method of Example 1.

(b) Tests under heat at 1000° C. were carried out, in which 1 kg samples were laid on castable refractory plates set in a small furnace, and after the samples flow-expanded their diameters were measured and evaluated as flowability under heat and gaps which were caused between the castable plates and the periphery of the flow-expanded samples were measured at 4 points and evaluated as warpage amount.

(c) Adhering strength was measured in the same way as described before.

(d) Bending strength of a sample after casting under heat at 1000° C. was measured as follows.

A refractory sagger with inner dimensions of 200×125×90 mm was set in a small furnace, it was heated to 1200° C. and after burning was stopped and the temperature of the inner surfaces of the sagger cooled to 1000° C., a 6 kg sample was charged into the sagger, let stand, and samples were prepared by cutting after cooling to normal temperatures. The bending strength was measured on these samples by usual methods. From the results, products of the present invention show good flowability under heat such as not less than 240 mm as well as sufficiently high adhering strength. Warpage amount was restricted to a grade of practically no problem. Comparative Example 2 contained a large molecular weight resin and insufficient adhering strength. As it had no self-flowability, flowing under heat was bad, it had less resin content and was inferior in bending strength. Comparative Example 3 contained a large molecular weight resin and had insufficient adhering strength with much resin content in the monolithic refractory and the warpage was very large. Conventional product 5 was a powdery material and had insufficient flowability under heat, adhering strength, warpage and bending strength.

Conventional product 6 was a bulk material 1–30 mm in size which was prepared by kneading refractory materials and resins under warm temperatures, and crushing after the material was cooled and solidified and had insufficient properties similar to conventional product 5. Conventional product 7 was a material prepared by kneading refractory materials and thermoset resin powder using glycerin. However, it had very bad flowability under heat and no adhering strength. As the material barely flowed, it was impossible to measure the amount of warpage.

TABLE 2

| | Product of Present Invention | | | | | | |
|---|---|---|---|---|---|---|---|
| | 5 | 6 | 7 | 8 | 9 | 10 | 11 |
| (Refractory material) | | | | | | | |
| Magnesia | 85 | 88 | | 84 | 70 | 80 | |
| Alumina | | | 85 | | 13 | | 87 |
| (Novolak phenol resin solution) | | | | | | | |
| No. average M.W. of resin | 281 | 330 | 447 | 525 | 290 | 450 | 340 |
| Solvent | Triethyleneglycol | Ethyleneglycol | Propyleneglycol | Dipropyleneglycol | Triethyleneglycol | Diethyleneglycol | Diethyleneglycol |
| (Free phenol) | | | Diethyleneglycol | Diethyleneglycol | Ethylenecellosolve | Ethyleneglycol | Ethanol |
| Content (%) | 7.5 | 6 | 1 | 2 | 10 | 1> | 7 |
| Resin content (%) | 45 | 35 | 40 | 60 | 25 | 40 | 70 |
| Viscosity (Poise) | 20 | 10 | 50 | 220 | 50 | 120 | 30 |
| Mix amount (%) | 15 | 12 | 15 | 16 | 17 | 18 | 13 |
| (Additive add. amount %) | | | | | | | |
| Polypropylene | | 2 | | | | | |

TABLE 2-continued

| | Product of Present Invention | | | | | | |
|---|---|---|---|---|---|---|---|
| Parafin | | 0.8 | | | | 3 | |
| Calcium stearate | | | | | 1.5 | | |
| Coke powder | | | 0.5 | | | | |
| Carbon black | | | | | | 0.1 | |
| Metal. aluminum | 1.5 | | | | | 3 | |
| Metal. silicon | | | | 1 | | | |
| Resin (%) in Mono. Ref. | 6.75 | 4.2 | 6.0 | 9.6 | 4.25 | 7.2 | 9.1 |
| Flow value (mm) | 158 | 131 | 149 | 129 | 166 | 170 | 135 |
| Form | Self-Flow | " | " | " | " | " | " |
| Flowability under 1000° C. (mm) | 275 | 245 | 256 | 251 | 280 | 288 | 248 |
| Adhering strength (Kg/cm²) | 6.8 | 6.5 | 9.3 | 5.9 | 4.8 | 5.2 | 5.3 |
| Warpage (mm) | 0.5~1.5 | 0~0.5 | 0.5~1.5 | 2~3.5 | 0~1 | 0.5~2 | 1.5~3.5 |
| Bending strength. of cast. product at 1000° C. (Kg/cm²) | 57 | 38 | 43 | 55 | 44 | 56 | 58 |

| | Comparative Example | | Conventional Product | | |
|---|---|---|---|---|---|
| | 2 | 3 | 5 | 6 | 7 |
| (Refractory material) | | | | | |
| Magnesia | 88 | 82 | 82 | 80 | |
| Alumina | | | | | 84 |
| Novolak phenol resin solution | | | Novo. phenol resin | " | " |
| No. average M.W. of resin | 830 | 680 | Powder | Pellet | Powder |
| Solvent | Dipropylene-glycol Ethyleneglycol | Triethylene-glycol Ethyleneglycol | non | non | Glycerin |
| Free phenol content (%) | 1> | 2 | | | |
| Resin content (%) | 25 | 60 | 100 | 100 | 37.5 |
| Viscosity (poise) | 180 | 160 | | | |
| Mix amount (%) | 12 | 18 | 18 | 20 | 16 |
| Metal aluminum | 1.5 | | | | |
| Resin (%) in Mono. Ref. | 3.0 | 10.8 | 18 | 20 | 6 |
| Flow value (mm) | 116 | 168 | | | |
| Form | Plastic | Self-Flow | Powder | Solid Crushed | Plastic |
| Flowability under 1000° C. (mm) | 155 | 257 | 146 | 167 | 121 |
| Adhering strength (Kg/cm²) | 0.1 | 0.3 | 0.6 | 0.2 | 0 |
| Warpage (mm) | 0.5~2 | 4.5~7 | 8~9 | 7~10 | — |
| Bending strength of cast. product at 1000° C. (Kg/cm²) | 21 | 49 | 20 | 28 | 35 |

Note:
Mono. Ref. denotes a monolithic refractory

Industrial Feasibility

Monolithic refractories with self-flowability of the first invention of the present invention hardly show sedimentation of refractory aggregates and show excellent flowability. Accordingly, they bring about various advantages. For instance, a large amount such as a ton of the refractory can be packed in a flexible container bag and the transport, storage and charging into a furnace as packed becomes possible. Therefore, the small packing such as in about 5-10 kg bags which was mainly used in conventional work, is not required and the work becomes easy. In the past, monolithic refractories with flowability have been kneaded by mixers etc. at the site of use. With the monolithic refractory material of the first invention of the present invention, the material can be kneaded and stored at a manufacturing factory and can be applied as a material which requires a flowability for lining at normal temperatures, for instance, for a filling material which fills gaps.

If 1-1.5 t of the product of the present invention is charged at a time together with the flexible container into a furnace at about 1200° C., for instance, when used for repairing a 250 t BOF the product flattens at once because of the good flowability and hardens after 20 min. Therefore, the BOF can be used thereafter. In the case when a conventional pitch material is used, it takes about 1.5 hrs for repairing and the life of the repair was 5-6 heats. However, by using the product of the present invention the life was sharply improved to such as 10-15 heats.

As the adhesion stability was obtained by the excellent flowability, adhering strength and restricted warpage, a monolithic refractory of the second invention of the present invention shows, for instance when it was used for repairing charging walls of a BOF, a 2-3 time longer life compared with the life obtained by repairing with a conventional resin bonded or pitch bonded monolithic refractory. Furthermore, the present invention also has advantages such as a decrease of fuming which resin bonded products originally have and short hardening time etc., and not only an improvement of repairing efficiency (decrease of repairing frequency, improvement of furnace life) but also it became possible to sharply improve the working environment.

What is claimed is:

1. A monolithic refractory with self-flowability which does not harden at room temperature comprising an organic separation preventative with a melting point or softening point of not less than 50° C., admixed with a formulation comprising 80 to 90 wt% refractory aggregate and 10 to 20 wt% liquid novolak type phenol resin dissolved in an organic solvent, said refractory having a flow value in the range of 125 to 180 mm at room temperature, and said organic separation preventative being at least one member selected from the group consisting of a polyolefin, a methane series hydrocarbon, an aliphatic acid or salts or esters thereof, being insoluble in the organic solvent containing the liquid novolak type phenol resin and being present in an amount sufficient to prevent separation of said refractory aggregate at room temperature.

2. The monolithic refractory according to claim 1, wherein the polyolefin is polyethylene or polypropylene, the methane series hydrocarbon is paraffin and the aliphatic acid is stearic acid.

3. A monolithic refractory which has self-flowability and does not harden at room temperature which is produced by kneading a phenol resin solution in which novolak type phenol resin with a number-average molecular weight of not more than 600 is dissolved in an organic solvent, with refractory aggregates to give a 3.5–10 wt% of phenol resin content and a flow value in the range of 125–180 mm at room temperature, wherein the monolithic refractory contains an organic separation preventative with a melting point or a softening point of not less than 50° C. in an amount sufficient to avoid precipitation of said refractory aggregate, said organic separation preventative being at least one member selected from the group consisting of a polyolefin, a methane series hydrocarbon, an aliphatic acid or salts or esters thereof, or oil or fat or salts or esters thereof and wherein said organic separation additive is insoluble in the organic solvent containing the novolak type phenol resin.

4. The monolithic refractory according to claim 3, wherein the polyolefin is polyethylene or polypropylene, the methane series hydrocarbon is paraffin and the aliphatic acid is stearic acid.

* * * * *